United States Patent [19]

Takahashi

[11] Patent Number: 4,984,456
[45] Date of Patent: Jan. 15, 1991

[54] DEVICE FOR DETECTING A MASS FLOW OF AIR FED INTO AN ENGINE CYLINDER

[75] Inventor: Hiroshi Takahashi, Toyota, Japan

[73] Assignee: Toyota Jidosha Kabushiki Kaisha, Aichi, Japan

[21] Appl. No.: 452,628

[22] Filed: Dec. 18, 1989

[30] Foreign Application Priority Data

Dec. 19, 1988 [JP] Japan ............................. 63-320212

[51] Int. Cl.$^5$ .......................................... G01M 15/00
[52] U.S. Cl. ................................................ 73/118.2
[58] Field of Search ............ 73/118.2, 861.21–861.23, 73/861.74–861.77; 123/494

[56] References Cited

U.S. PATENT DOCUMENTS

| | | | |
|---|---|---|---|
| 4,392,386 | 7/1983 | Knetsch et al. | 73/118.2 |
| 4,589,279 | 5/1986 | Mitsuyasu et al. | |
| 4,823,755 | 4/1989 | Hirose et al. | 123/480 |
| 4,875,377 | 10/1989 | Robertson | 73/861.53 |

FOREIGN PATENT DOCUMENTS

| | | |
|---|---|---|
| 55-35253 | 3/1980 | Japan. |
| 58-110821 | 7/1983 | Japan. |
| 60-145241 | 9/1985 | Japan. |
| 60-145242 | 9/1985 | Japan. |
| 60-174839 | 11/1985 | Japan. |
| 60-174840 | 11/1985 | Japan. |
| 61-99012 | 6/1986 | Japan. |
| 61-283822 | 12/1986 | Japan. |
| 63-72518 | 5/1988 | Japan. |

Primary Examiner—Robert Raevis
Attorney, Agent, or Firm—Kenyon & Kenyon

[57] ABSTRACT

An engine having a charger arranged in the intake passage, and a Karman vortex type air flow meter or a movable vane typed air flow meter also arranged in the intake passage, downstream of the charger. Further a pressure sensor and a temperature sensor are arranged in the intake passage downstream of the charger. The mass flow of air fed into an engine cylinder is calculated from the signals output by the air flow meter, the pressure sensor, and the temperature sensor.

8 Claims, 8 Drawing Sheets

DEVICE FOR DETECTING A MASS FLOW OF AIR FED INTO AN ENGINE CYLINDER

BACKGROUND OF THE INVENTION

1. Field of the Invention

The present invention relates to a device for detecting a mass flow of air fed into an engine cylinder.

2. Description of the Related Art

It is necessary to detect the amount of air fed into the cylinders of an engine to control, for example, the ignition timing and the amount of fuel fed into the engine cylinders. Consequently, to detect the amount of air fed into the engine cylinders, in a known engine equipped with a charger such as a turbocharger or a mechanically driven supercharger, a movable vane type air flow meter or a Karman vortex type air flow meter is arranged in the intake passage upstream of the charger (see, for example, Japanese Unexamined Patent Publication No. 55-35253).

Nevertheless, where the engine is equipped with the charger, the range of change in the amount of air fed into the engine cylinders is wide compared with the case where the engine is not equipped with the charger. Conversely, the range of the amount of air which can be correctly detected by the movable vane type air flow meter or the Karman vortex type air flow meter is restricted. Consequently, if such an air flow meter is arranged in the intake passage upstream of the charger, a problem occurs in that the amount of air can not be correctly detected by the air flow meter over the entire operating state of the engine.

SUMMARY OF THE INVENTION

An object of the present invention is to provide a device capable of correctly detecting the mass flow of air fed into the engine cylinder, over the entire operating state of the engine.

According to the present invention, there is provided a device for detecting a mass flow of air in an intake passage of an engine, which passage has a charger mounted therein, the device comprising: air flow detecting means arranged in the intake passage downstream of the charger, to detect an amount of air flowing in the intake passage and produce an output signal which at least partly represents a velocity of air flowing in the intake passage; a pressure sensor arranged in the intake passage downstream of the charger, to detect a pressure in the intake passage and produce an output signal representing the pressure in the intake passage; a temperature sensor arranged in the intake passage downstream of the charger to detect a temperature of air flowing in intake passage and produce an output signal which represents the temperature of air flowing in the intake passage; and means for calculating a mass flow of air flowing in the intake passage on the basis of signals output by the air flow detecting means, the pressure sensor, and the temperature sensor.

The present invention may be more fully understood from the description of preferred embodiments of the invention set forth below, together with the accompanying drawings.

DESCRIPTION OF THE PREFERRED EMBODIMENTS

Figure 1:
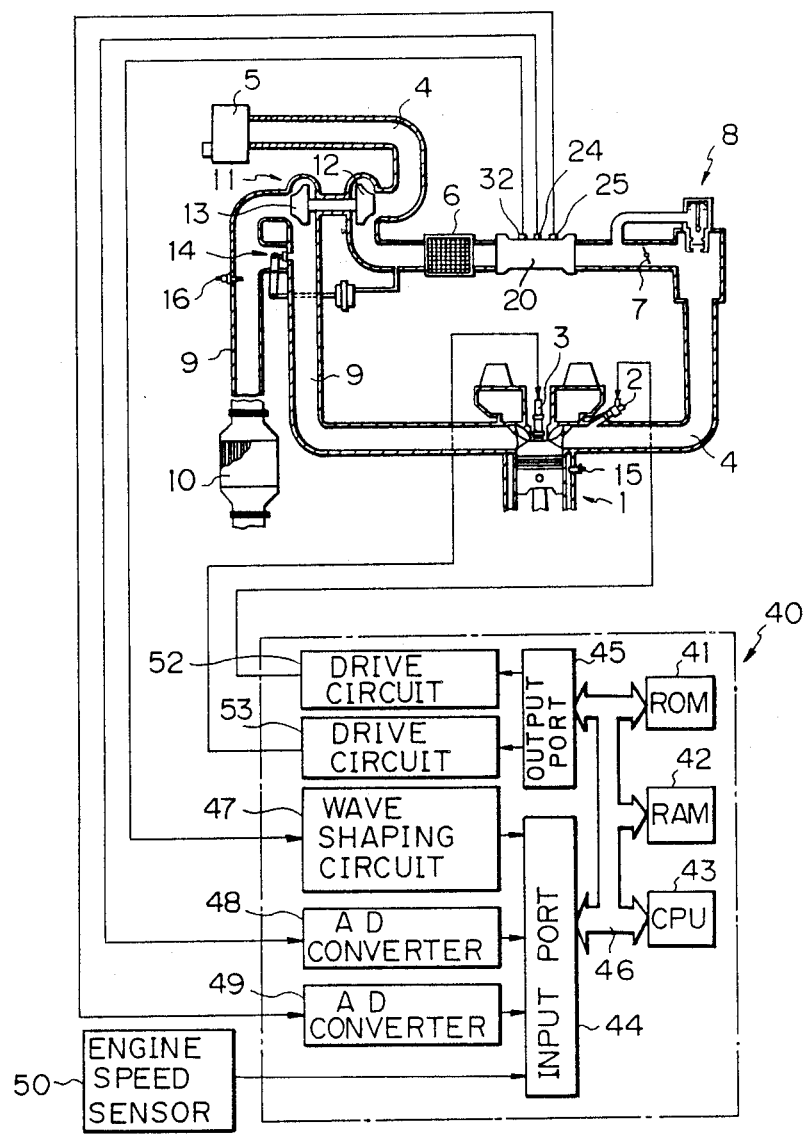
FIG. 1 is schematic view of an engine.

Referring to FIG. 1, reference numeral 1 designates an engine body, 2a fuel injector, 3 a spark plug, 4 an intake passage, 5 an air cleaner arranged at the inlet of the intake passage 4, 6 an intercooler arranged in the intake passage 4, 7a throttle valve arranged in the intake passage 4 downstream of the intercooler 6, 8 an idle speed control device, 9 an exhaust passage, 10 a three way catalytic converter, and 11 a turbocharger comprising a compressor 12 and a turbine 13. The compressor 12 of the turbocharger 11 is arranged in the intake passage 4 between the air cleaner 5 and the intercooler 6, and the turbine 13 of the turbocharger 11 is arranged in the exhaust passage 9. The amount of exhaust gas fed into the turbine 13 is controlled by a waste gate valve 14. Air pressurized by the compressor 12 is cooled by the intercooler 6 and then fed into the engine cylinders via the throttle valve 7. A cooling water temperature sensor 15 is mounted on the engine body 1, and an oxygen concentration sensor 16 is arranged in the exhaust passage 9. As can be seen from FIG. 1, a mass flow detecting assembly 20 is arranged in the intake passage 4 between the intercooler 6 and the throttle valve 7.

Figure 2:
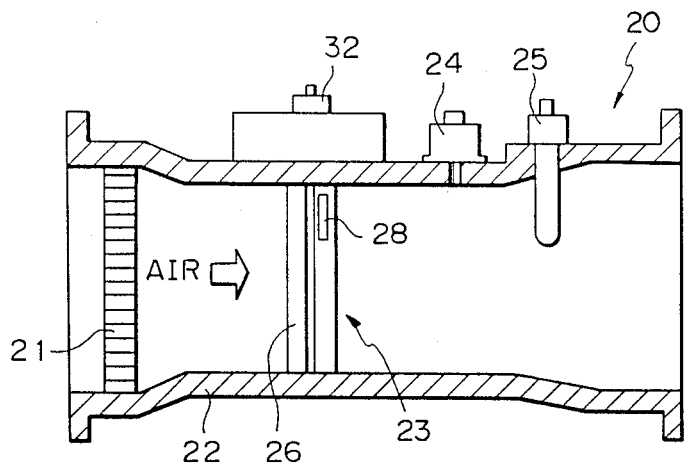
FIG. 2 is a cross-sectional side view of the mass flow detecting assembly illustrated in FIG. 1.

Referring to FIG. 2, the mass flow detecting assembly 20 comprises a honeycomb-shaped rectifier 21 arranged at the inlet of a tubular casing 22, a Karman vortex type air flow meter 23 arranged in the casing 22 downstream of the rectifier 21, a pressure sensor 24 arranged in the casing 22 downstream of the air flow, meter 23, to detect the absolute pressure in the casing 22, and a temperature sensor 25 arranged in the casing 22 downstream of the pressure sensor 24, to detect the temperature of air flowing within the casing 22.

Figure 3:
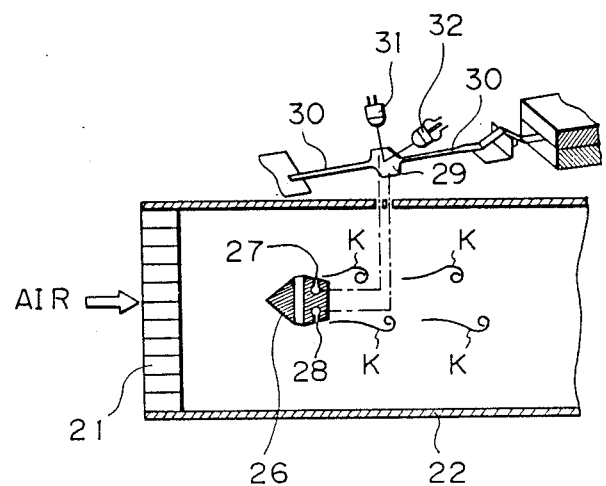
FIG. 3 is a schematic view of the Karman vortex type air flow meter.

Referring to FIGS. 2 and 3, the Karman vortex type air flow meter 23 comprises a bar 26, a pair of pressure introduction bores 27, 28 formed on each side of the bar 26, a mirror member 29 supported by the metal strips 30, a light emitting diode 31 for emitting light toward the surface of the mirror member 29, and a photo transistor 32 for receiving the light reflected from the mirror member 29.

As illustrated in FIG. 3, when air flows past the bar 26, a Karman vortex K is alternately generated on each side of the bar 26, and thus pressures in the pressure introduction bores 27, 28 are alternately changed. These pressures are introduced to the rear face of the mirror member 29, and thus the mirror member 29 is oscillated every time the Karman vortex K is generated. The photo transistor 32 produces an output voltage proportional to the intensity of the reflected light, and thus the output voltage of the photo transistor 32 is also changed every time the Karman vortex is generated. The frequency of the generation of the Karman vortex is proportional to the velocity of air flow, and thus the photo transistor 32 produces an output voltage changing at a frequency proportional to the velocity of air. As illustrated in FIG. 1, the pressure sensor 24, the temperature sensor 25, and the photo transistor 32 are connected to an electronic control unit 40.

As illustrated in FIG. 1, the electronic control unit 40 is constructed as a digital computer and comprises a ROM (read only memory) 41, a RAM (random access memory) 42, a CPU (microprocessor etc.) 43, an input port 44, and an output port 45. The ROM 41, the RAM 42, the CPU 43, the input port 44 and the output port 45 are interconnected to each other via a bidirectional bus 46.

As mentioned above, the photo transistor 32 produces an output voltage changing at a frequency proportional to the velocity of air flowing within the mass flow detecting assembly 20. The output voltage of the photo transistor 32 is input to a wave-shaping circuit 47 and converted to pulse signals produced at a frequency proportional to the velocity of air flow. These pulse signals are input to the input port 44, and the velocity of air flowing within the mass flow detecting assembly 20 is calculated from these pulses in the CPU 43. The pressure sensor 24 produces an output voltage proportional to the absolute pressure in the mass flow detecting assembly 20, and this output voltage is input to the input port 44 via an AD converter 48. The temperature sensor 25 produces an output voltage proportional to the temperature of air in the mass flow detecting assembly 20, and this output voltage is input to the input port 44 via an AD converter 49. In addition, the output signal of an engine speed sensor 50, which represents an engine speed, is input to the input port 44. The output port 45 is connected to the fuel injector 2 and the spark plug 3 via corresponding drive circuits 52 and 53.

In an engine, the actual amount of air, i.e., the mass flow of air, has a great influence on the combustion, and thus it is necessary to control the ignition timing and the amount of fuel injected by the fuel injector 2 on the basis of the mass flow of air. Nevertheless, the physical quantity detected by the Karman vortex air flow meter 23 is the velocity of air flow, not the mass flow of air, and even if the velocity of air flow is constant, the mass flow of air is increased as the pressure of the air becomes higher, and the mass flow of air is reduced as the temperature of the air is increased. Consequently, in the embodiment illustrated in FIG. 1, to calculate the mass flow of air from the velocity of air flow, the pressure sensor 24 and the temperature sensor 25 are provided.

Figure 4:
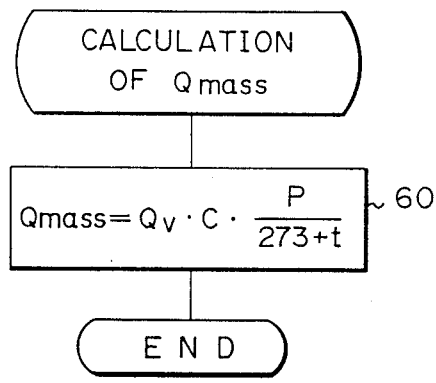
FIG. 4 is a flow chart for calculating the mass flow of air.

FIG. 4 illustrates a routine for calculating the mass flow of air, Q mass. This routine is processed by sequential interruptions executed at predetermined intervals.

Referring to FIG. 4, at step 60, the mass flow of air Q mass is calculated from the following equation, on the basis of the signals output by the pressure sensor 24, the temperature sensor 25, and the photo transistor 32.

$$Q\text{mass} = Q_v \cdot C \cdot \frac{P}{273 + t}$$

where
 $Q_v$: volume of air flowing within the mass flow detecting assembly 20 per unit time.
 C: constant
 P: absolute pressure (e.g., atm) detected by the pressure sensor 24
 t: temperature °C. detected by the temperature sensor 25

Figure 5:
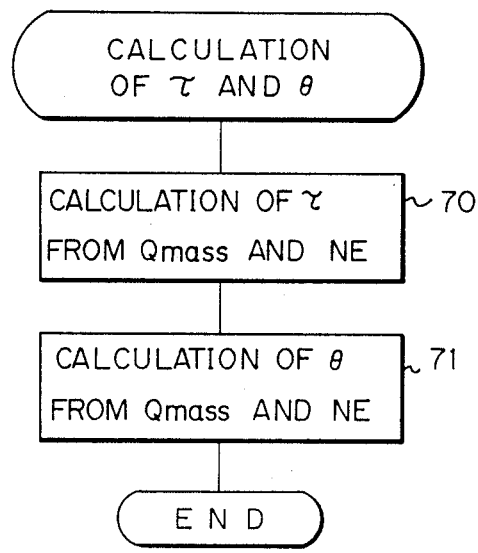
FIG. 5 is a flow chart for calculating the injection timing and the ignition timing.

FIG. 5 illustrates a routine for calculating the injection timing $\tau$ and the ignition timing $\Theta$. This routine is processed by sequential interruptions executed at a predetermined crank angle.

Referring to FIG. 5, at step 70, the injection timing $\tau$ is calculated from the mass flow of air Q mass and the engine speed NE. Then, at step 71, the ignition timing $\Theta$ is calculated from the mass flow of air Q mass and the engine speed NE.

Figure 6:
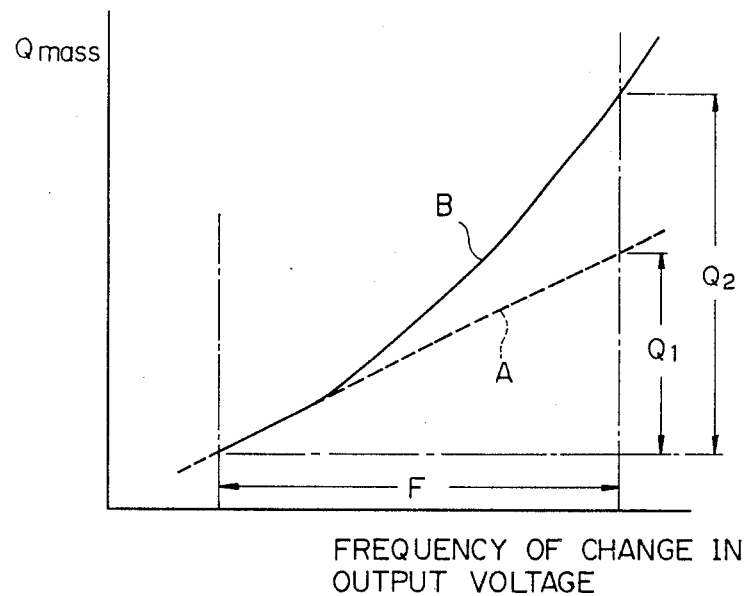
FIG. 6 is a diagram illustrating the relationship between the mass flow of air and the frequency of change in the output voltage of the Karman vortex type air flow meter.

FIG. 6 illustrates the relationship between the mass, plotted along the ordinate flow of air Q mass and the frequency of change in the output voltage, plotted along the abscissa of the photo transistor 32. As mentioned above, the frequency of change in the output voltage of the photo transistor 32 is proportional to the velocity of air flow, and thus the abscissa of FIG. 6 indicates the velocity of air flow. In FIG. 6, F indicates the range of the velocity of air flow which can be detected by the Karman vortex type air flow meter 23. Note, in FIG. 6, the broken line A indicates the case where the Karman vortex type air flow meter 23 is arranged in the intake passage 4 upstream of the compressor 12 of the turbocharger 11, and the solid line B indicates the case where the Karman vortex type air flow meter 23 is arranged in the intake passage 4 downstream of the compressor 12, as illustrated in FIG. 1.

When the turbocharger 11 is operated, air is pressurized by the compressor 12, and at the same time, the temperature of the air is increased in the compressor 12. The temperature of the air discharged from the compressor 12 is increased to as high as 100° C. to 120° C., which corresponds to a decrease of air density at constant pressure of about 35%. Conversely, the absolute pressure of air discharged from the compressor 12 is increased to 1.5 to 1.6 atm, which corresponds to an increase of air density at constant temperature of more than 50%. Consequently, there is a net increase of air density downstream of the compressor 12; Since the mass flow of air downstream of the compressor 12 necessarily is equal to that upstream of the compressor 12, the downstream velocity is reduced from the upstream velocity by an amount corresponding to the net increase in air density through the compressor. As a result, for a given mass flow operating range of the engine, the velocity range downstream of the compressor will be less than the velocity range upstream.

Therefore, as illustrated in FIG. 6, the range of the mass flow of air Q2 which can be detected by the Karman vortex type air flow meter 23 arranged downstream of the compressor 12 becomes greater than the range of the mass flow of air Q1 which can be detected by the Karman vortex type air flow meter 24 arranged upstream of the compressor 12. Consequently, by detecting the velocity of air downstream of the compressor 12 by the Karman vortex type air flow meter 23, it is possible to correctly detect the mass flow air over the entire operating state of the engine.

FIGS. 7 through 11 illustrate an alternative embodiment of the present invention. In this embodiment, similar components are indicated by the same reference numerals used in the embodiment illustrated in FIGS. 1 through 6.

Figure 7:
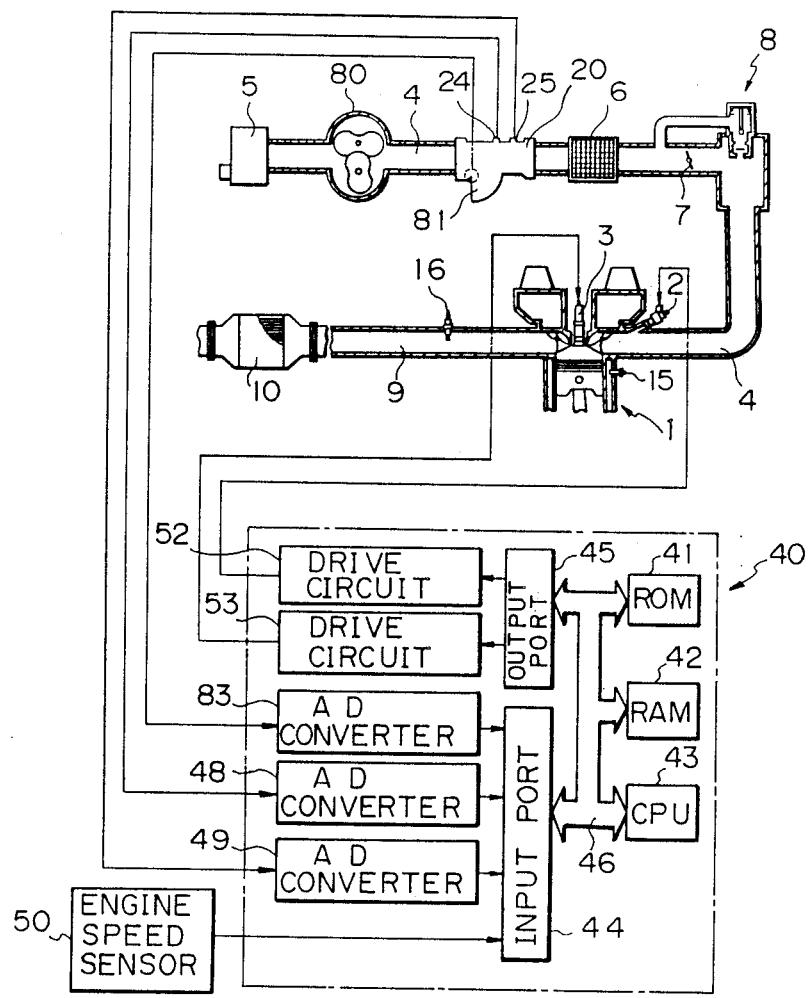
FIG. 7 is a schematic view of an alternative embodiment of an engine.
Figure 8:
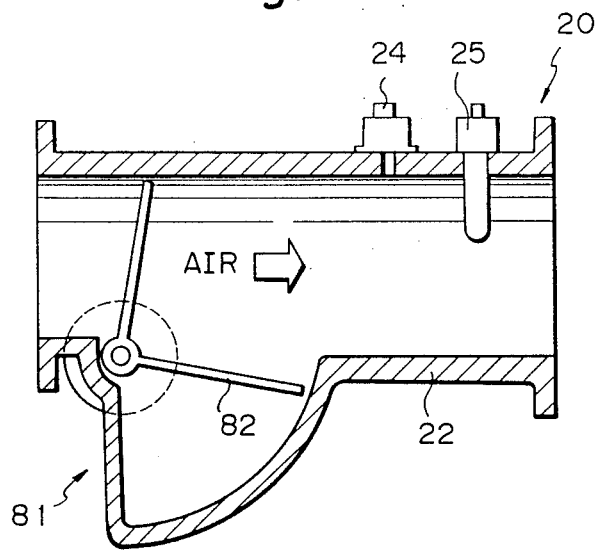
FIG. 8 is a cross-sectional side view of the movable vane type air flow meter illustrated in FIG. 7.

In this embodiment, as illustrated in FIG. 7, a mechanically driven supercharger 80 driven by the engine is arranged in the intake passage 4, and the mass flow detecting assembly 20 is arranged in the intake passage 4 between the mechanically driven supercharger 80 and the intercooler 6. Further, in this embodiment as illustrated in FIG. 8, a movable vane type air flow meter 81 having a movable vane 82 is arranged at the inlet of the casing 22 of the mass flow detecting assembly 20, and the pressure sensor 24 and the temperature sensor 25 are arranged in the casing 22 downstream of the movable vane type air flow meter 81. When the amount of air flowing into the casing 22 is increased, the vane 82 rotates in the clockwise direction, and the air flow meter 81 produces an output voltage proportional to the rotation angle of the vane 82. This output voltage is input to the input port 44 via an AD converter 83 as illustrated in FIG. 7.

In the movable vane type air flow meter 81 as illustrated in FIG. 8, the rotation angle of the vane 82 depends on the momentum (m.v) of the air, i.e., both the mass of air m and the velocity of air v have an influence on the rotation angle of the vane 82. Roughly, the mass of air m has about a 50% influence on the rotation angle of the vane 82, and the velocity of air v also has about a 50% influence on the rotation angle of the vane 82. Of course, these percentages depend on the rotation angle of the vane 82 and the density of air $\rho(=P/273+t)$, i.e., on the output voltage V of the air flow meter 81 and the density of air $\rho$, and these percentages can be obtained by the experiments. The percentage K of the influence of the mass flow of air, obtained by experiments, is stored in the ROM 41 in the form of map illustrated in FIG. 9.

Figure 10:
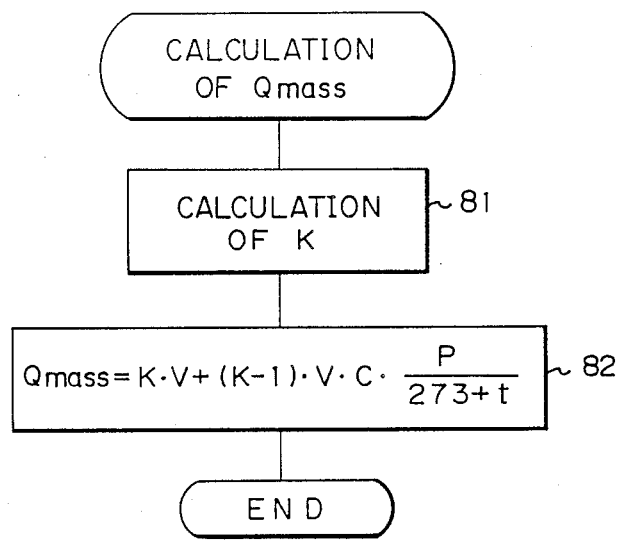
FIG. 10 is a flow chart for calculating the mass flow of air.

FIG. 10 illustrates a routine for calculating the mass flow of air Q mass. This routine is processed by sequential interruptions executed at predetermined intervals.

Figure 9:
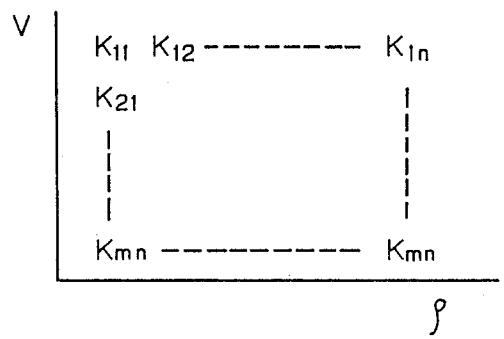
FIG. 9 is a diagram illustrating the percentage K stored in the ROM in the form of a map.

Referring to FIG. 10, at step 81, the density of air $\rho$ is calculated based on the output signals of the pressure sensor 24 and the temperature sensor 25, and the percentage K is calculated from the map illustrated in FIG. 9. Then, at step 82, the mass flow of air Q mass is calculated from the following equation.

$$Q\text{mass} = K \cdot Vt + (K-1) \cdot V \cdot C \cdot \frac{P}{273+t}$$

where
K: the percentage of the influence of the mass flow of air
V: the output voltage of the movable vane type air flow meter 81
C: constant
P: absolute pressure (e.g. atm) detected by the pressure sensor 24
t: temperature °C. detected by the temperature sensor 25

In the above equation, K·V indicates a portion of the output voltage V, which is based on the mass flow of air m, and (K−1)·V indicates a portion of the output voltage V, which is based on the velocity of air v. Further, $$C \cdot \frac{P}{273+t}$$

indicates a coefficient for converting the velocity of air v to the mass flow of air m.

Figure 11:
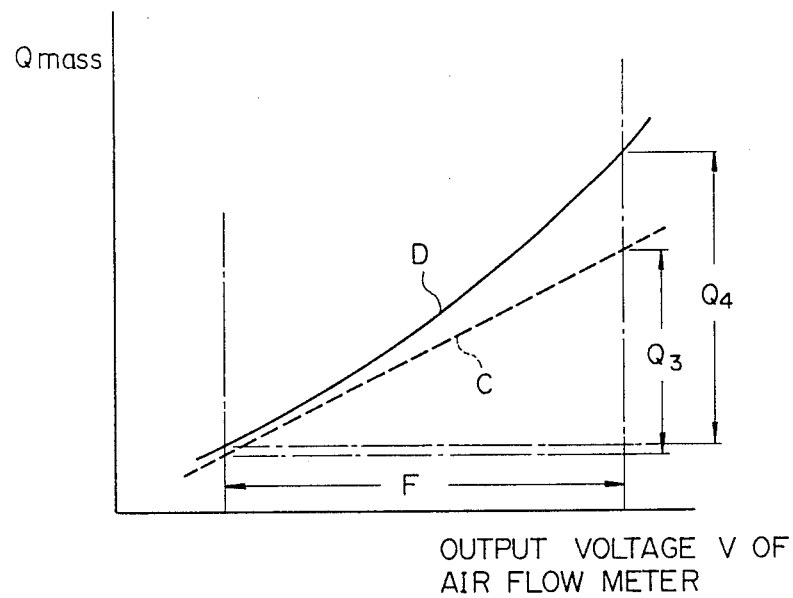
FIG. 11 is a diagram illustrating the relationship between the mass flow of air and the output voltage of the movable vane type air flow meter.

FIG. 11 illustrates the relationship between the mass flow of air Q mass and the output voltage V of the movable vane type air flow meter 81. In FIG. 11, F indicates the range of the output voltage V of the air flow meter 81 within which the air flow meter 81 correctly measures air flow velocity. Further, in FIG. 11, the broken line C indicates the case where the movable vane type air flow meter 81 is arranged in the intake passage 4 upstream of the mechanically driven supercharger 80, and the solid line D indicates the case where the movable vane type air flow meter 81 is arranged in the intake passage 4 downstream of the mechanically driven supercharger 80.

Also in this embodiment, for a given velocity of air flow measured in the intake passage 4 downstream of the supercharger 80 and in the intake passage 4 upstream of the supercharger 80, the mass flow of air downstream of the supercharger 80 is larger than that upstream of the supercharger 80. Consequently, as illustrated in FIG. 11, the range of the mass flow of air Q4 which can be detected accurately by the movable vane type air flow meter 81 arranged downstream of the supercharger 80, becomes greater than the range of the mass flow of air Θ3 which can be detected accurately by the movable vane type air flow meter 81 arranged upstream of the supercharger 80.

In the embodiment illustrated in FIG. 7, the mass flow detecting assembly 20 is arranged in the intake passage 4 upstream of the intercooler 6. Consequently, pressure fluctuations caused by air pulsations generated in the intake passage 4 near the engine cannot be propagated to the mass flow detecting assembly 20, due to the intercooler 6, and thus an advantage is obtained in that the influence of such pressure fluctuations on the accuracy of detection of the air flow meter 81 is eliminated.

According to the present invention, even if the engine is equipped with a charger, it is possible to correctly detect the mass flow of air over the entire operating state of the engine.

While the invention has been described by reference to specific embodiments chosen for purpose of illustration, it should be apparent that numerous modifications could be made thereto by those skilled in the art without departing from the basic concept and scope of the invention.

I claim:

1. A device for determining mass flow of air in an intake passage of an engine, which passage has a charger mounted therein, said device comprising:
air flow velocity detecting means arranged in the intake passage downstream of the charger to detect air flowing in the intake passage and to produce an output signal which represents, to a desired accuracy over a predetermined range of measurement, air flow velocity in the intake passage downstream of the charger;
a pressure sensor arranged in the intake passage downstream of the charger to detect a pressure in the intake passage and to produce an output signal representing the pressure in the intake passage;

a temperature sensor arranged in the intake passage downstream of the charger to detect a pressure in the intake passage and to produce an output signal which represents the temperature of the air flowing in the intake passage; and means for calculating mass flow of the air flowing in the intake passage on the basis of the signals output by said air flow velocity detecting means, said pressure sensor, and said temperature sensor.

2. A device according to claim 1, wherein said air flow detecting means is a Karman vortex type air flow meter.

3. A device according to claim 1, wherein said air flow detecting means is a movable vane type air flow meter.

4. A device according to claim 1, wherein said pressure sensor and said temperature sensor are arranged downstream of said air flow detecting means.

5. A device according to claim 4, wherein said temperature sensor is arranged downstream of said pressure sensor.

6. A device according to claim 1, wherein the intake passage has an intercooler mounted therein, and said air flow detecting means, said pressure sensor and said temperature sensor are arranged downstream of said intercooler.

7. A device according to claim 1, wherein the intake passage has an intercooler mounted therein, and said air flow detecting means, said pressure sensor and said temperature sensor are arranged upstream of said intercooler.

8. A device according to claim 1, wherein said air flow detecting means, said pressure sensor and said temperature sensor are incorporated into a mass flow detecting assembly arranged in the intake passage.

* * * * *